(12) United States Patent
Sakurai

(10) Patent No.: US 10,668,772 B2
(45) Date of Patent: Jun. 2, 2020

(54) TIRE

(71) Applicant: BRIDGESTONE CORPORATION, Tokyo (JP)

(72) Inventor: Hideyuki Sakurai, Ogawacho-Kodairashi (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/576,365

(22) PCT Filed: Jun. 2, 2016

(86) PCT No.: PCT/JP2016/002690
§ 371 (c)(1),
(2) Date: Nov. 22, 2017

(87) PCT Pub. No.: WO2016/194387
PCT Pub. Date: Dec. 8, 2016

(65) Prior Publication Data
US 2018/0170105 A1    Jun. 21, 2018

(30) Foreign Application Priority Data
Jun. 3, 2015  (JP) .................... 2015-113308

(51) Int. Cl.
*B60C 1/00*  (2006.01)
*B60C 15/06*  (2006.01)
(Continued)

(52) U.S. Cl.
CPC ........ *B60C 1/0016* (2013.01); *B60C 15/0603* (2013.01); *C08K 3/36* (2013.01);
(Continued)

(58) Field of Classification Search
CPC ......... B60C 1/0016; B60C 15/06; B60C 1/00; C08L 9/06; C08L 7/00; C08L 2205/03; C08K 3/36; Y02T 10/862
See application file for complete search history.

(56) References Cited

U.S. PATENT DOCUMENTS

2007/0261773 A1   11/2007   Onuma et al.
2009/0151844 A1   6/2009   Miyazaki
(Continued)

FOREIGN PATENT DOCUMENTS

CN    101484519 A    7/2009
CN    103827196 A    5/2014
(Continued)

OTHER PUBLICATIONS

Communication dated Jun. 5, 2018, from the European Patent Office in counterpart European Application No. 16802827.2.
(Continued)

*Primary Examiner* — Andrew J. Oyer
(74) *Attorney, Agent, or Firm* — Sughrue Mion, PLLC

(57) ABSTRACT

A tire has excellent wet performance without leading to a reduction in steering stability. The tire includes a tread portion and a pair of bead portions each with a bead core and a bead filler disposed on the radial outside of the bead core. Tread rubber forming the tread portion includes a rubber composition including a rubber component (A) and, per 100 parts by mass of the rubber component (A), 5 to 50 parts by mass of at least one kind of thermoplastic resin (B) selected from the group consisting of $C_5$-based resins, $C_5$- to $C_9$-based resins, $C_9$-based resins, terpene-based resins, terpene-aromatic compound-based resins, rosin-based resins, dicyclopentadiene resins, and alkylphenol-based resins, and
(Continued)

20 to 120 parts by mass of a filler (C) including silica. The dynamic storage modulus (E') of the bead filler exceeds 50 MPa.

6 Claims, 1 Drawing Sheet

(51) Int. Cl.
  *C08L 57/00* (2006.01)
  *C08K 3/36* (2006.01)
  *C08L 9/06* (2006.01)
  *C08L 7/00* (2006.01)
  *B60C 11/00* (2006.01)

(52) U.S. Cl.
  CPC ............... *C08L 7/00* (2013.01); *C08L 9/06* (2013.01); *C08L 57/00* (2013.01); *B60C 2001/0058* (2013.01); *B60C 2011/0025* (2013.01)

(56) References Cited

U.S. PATENT DOCUMENTS

| | | | |
|---|---|---|---|
| 2012/0031537 A1* | 2/2012 | Izuchi | B60C 1/0016 152/526 |
| 2012/0152425 A1* | 6/2012 | Kawashima | B60C 17/0009 152/517 |
| 2013/0075010 A1 | 3/2013 | Miyazaki | |
| 2014/0000780 A1* | 1/2014 | Bruneau | B60C 15/0603 152/541 |
| 2014/0235751 A1 | 8/2014 | Lesage et al. | |
| 2016/0229992 A1 | 8/2016 | Peters et al. | |
| 2016/0251503 A1 | 9/2016 | Chenchy et al. | |

FOREIGN PATENT DOCUMENTS

| | | |
|---|---|---|
| EP | 1 535 758 A1 | 6/2005 |
| EP | 2 292 451 A1 | 3/2011 |
| EP | 2651663 B1 | 2/2015 |
| EP | 3 150 662 A1 | 4/2017 |
| JP | 53-004902 A | 1/1978 |
| JP | 61-071202 A | 4/1986 |
| JP | 61-295103 A | 12/1986 |
| JP | 4-342603 A | 11/1992 |
| JP | 5-269884 A | 10/1993 |
| JP | 6-262903 A | 9/1994 |
| JP | 2001-011237 A | 1/2001 |
| JP | 2005-047957 A | 2/2005 |
| JP | 2005-153782 A | 6/2005 |
| JP | 2006-076442 A | 3/2006 |
| JP | 2007-056137 A | 3/2007 |
| JP | 2009-256540 A | 11/2009 |
| JP | 2009-298247 A | 12/2009 |
| JP | 2012-12611 A | 1/2012 |
| JP | 2012-97280 A | 5/2012 |
| JP | 2013-545671 A | 12/2013 |
| WO | 2015043790 A1 | 4/2015 |
| WO | 2015/077800 A1 | 5/2015 |
| WO | 2015/182778 A1 | 12/2015 |

OTHER PUBLICATIONS

Search Report dated Dec. 21, 2019 from the State Intellectual Property Office of the P.R.C. in application No. 201680032022.3.
International Search Report for PCT/JP2016/002690 dated Aug. 9, 2016 [PCT/ISA/210].

* cited by examiner

TIRE

CROSS REFERENCE TO RELATED APPLICATIONS

This application is a National Stage of International Application No. PCT/JP2016/002690 filed Jun. 2, 2016, claiming priority based on Japanese Patent Application No. 2015-113308 filed Jun. 3, 2015, the contents of all of which are incorporated herein by reference in their entirety.

TECHNICAL FIELD

This disclosure relates to a tire.

BACKGROUND

In view of improving vehicle safety, improvement in a tire's braking performance and driving performance not only on dry road surfaces but also on other surfaces such as wet road surfaces and icy and snowy road surfaces is desired.

For example, Patent Literature (PTL) 1 discloses a technique to use, as the tread rubber, a rubber composition prepared by compounding an aroma oil together with rubber components such as natural rubber (NR) and butadiene rubber (BR) to improve performance on wet road surfaces.

To improve gripping performance on icy and snowy road surfaces and wet road surfaces, PTL 2 discloses a technique to use, as the tread rubber, a rubber composition obtained by compounding 5 parts by mass to 50 parts by mass of $C_5$-based resins per 100 parts by mass of a rubber component that includes a total of 30 mass % or greater of natural rubber and/or polyisoprene rubber.

CITATION LIST

Patent Literature

PTL 1: JP H5-269884 A
PTL 2: JP 2009-256540 A

SUMMARY

Technical Problem

However, the technique in PTL 1 to compound an aroma oil has problems such as the following. Aroma oils are not highly compatible with NR and BR and thus produce little effect of improving performance on wet road surfaces. In addition, a rubber composition compounded with an aroma oil has increased rolling resistance. The rubber composition obtained by compounding 5 parts by mass to 50 parts by mass of $C_5$-based resins per 100 parts by mass of the rubber component that includes 30 mass % or greater of natural rubber and/or polyisoprene rubber does not have high braking performance on dry road surfaces and also fails to achieve satisfactory wet braking performance on road surfaces slipperier than asphalt, such as manholes.

Furthermore, PTL 1 and PTL 2 aim to improve the braking performance on wet road surfaces (wet performance) by increasing the flexibility of the tread rubber, which could lead to a reduction in steering stability caused by a reduction in tread rigidity.

It would therefore be helpful to provide a tire that has excellent wet performance without leading to a reduction in steering stability.

Solution to Problem

We conducted thorough research to achieve this purpose.
We discovered that the wet performance of a tire can be greatly improved by using a certain rubber composition as the rubber constituting the tread portion. This rubber composition has compounded therein a rubber component containing a large amount of natural rubber that is highly compatible with a thermoplastic resin and has compounded therein a particular type of thermoplastic resin that contributes to increasing the wet performance of the tire. Furthermore, we discovered that excellent steering stability can be achieved, even if the flexibility of the tread increases, by setting the dynamic storage modulus (E') measured at 1% strain to a high value for the bead fillers disposed on the radial outside of the bead cores.

A tire of this disclosure includes a tread portion; and a pair of bead portions comprising a bead core and a bead filler disposed on a radial outside of the bead core, wherein tread rubber forming the tread portion comprises a rubber composition including a rubber component (A) including 50 mass % or more of natural rubber, at least one kind of thermoplastic resin (B) selected from the group consisting of $C_5$-based resins. $C_5$- to $C_9$-based resins, $C_9$-based resins, terpene-based resins, terpene-aromatic compound-based resins, rosin-based resins, dicyclopentadiene resins, and alkylphenol-based resins, 5 parts by mass to 50 parts by mass per 100 parts by mass of the rubber component (A) of the at least one kind of thermoplastic resin (B) being included, and a filler (C) including silica, 20 parts by mass to 120 parts by mass per 100 parts by mass of the rubber component (A) of the filler (C) being included, and a dynamic storage modulus (E') of the bead filler measured at 1% strain at 25° C. exceeds 50 MPa.

With this configuration, an excellent wet performance can be achieved without leading to a reduction in steering stability.

In the tire of this disclosure, the content of the silica in the filler (C) is preferably 50 mass % to 100 mass % and more preferably 90 mass % or higher.

The reason is that this configuration achieves effects such as reducing the rolling resistance and improving the wet performance, while tending not to impair the flexibility of the rubber component.

In the tire of this disclosure, 10 mass % to 50 mass % of styrene-butadiene copolymer rubber is preferably included in the rubber component (A).

The reason is that this configuration improves the braking performance and steering stability on dry road surfaces.

Furthermore, in the tire of this disclosure, the ratio of the 50% modulus of the tread rubber to the dynamic storage modulus (E') of the bead filler is preferably 0.005 to 0.02.

The reason is that this configuration can achieve an even better wet performance and steering stability.

Advantageous Effect

According to this disclosure, a tire that has excellent wet performance without leading to a reduction in steering stability can be provided.

BRIEF DESCRIPTION OF THE DRAWINGS

In the accompanying drawings.

DETAILED DESCRIPTION

Figure 1:
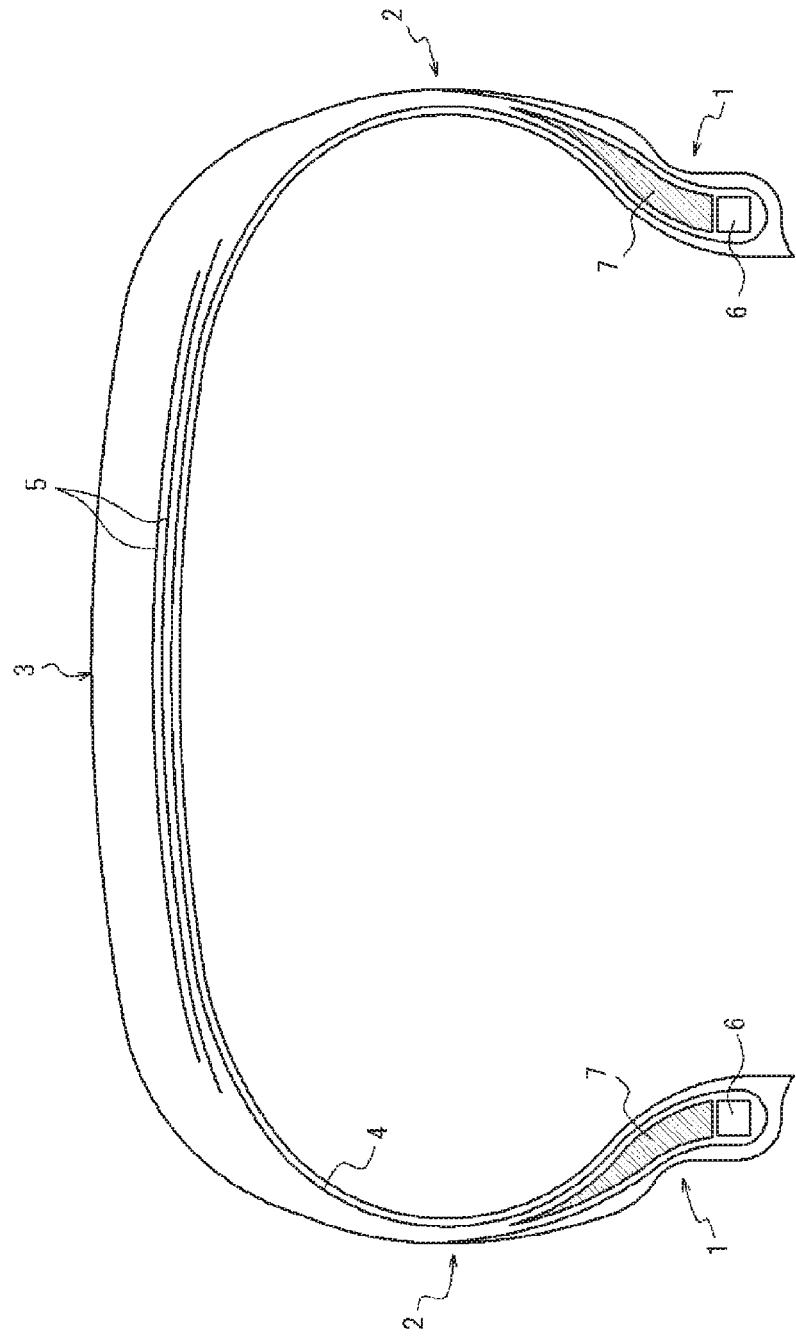
FIG. 1 is a cross-sectional diagram in the width direction illustrating a tire according to one Embodiment.

With reference to the drawings, one embodiment of a tire of this disclosure tire will be described below in detail with examples.

As illustrated in FIG. 1, a tire of this disclosure includes a tread portion 3 and a pair of bead portions 1 each including a bead core 6 and a bead filler 7 disposed on the radial outside of the bead core 6.

While not limited in this way, the tire of this disclosure may include the following in addition to the tread portion 3 and the pair of bead portions 1, as illustrated in FIG. 1: a pair of sidewall portions 2 continuing outward in the tire radial direction from the bead portions 1, a carcass 4 extending toroidally across each portion of the tire between the bead cores 6 embedded in the bead portions 1, and a belt composed of a plurality of belt layers 5 disposed outward in the tire radial direction from a crown portion of the carcass 4. The tire of this disclosure can be used as a typical radial tire or run flat tire.

Tread Rubber

The tread rubber constituting the tread portion of a tire of this disclosure includes a rubber component (A) including 50 mass % or more of natural rubber; at least one kind of thermoplastic resin (B) selected from the group consisting of $C_5$-based resins, $C_5$- to $C_9$-based resins, $C_9$-based resins, terpene-based resins, terpene-aromatic compound-based resins, rosin-based resins, dicyclopentadiene resins, and alkylphenol-based resins, 5 parts by mass to 50 parts by mass of the at least one kind of thermoplastic resin (B) being included per 100 parts by mass of the rubber component; and a filler (C) including silica, 20 parts by mass to 120 parts by mass of the filler (C) being included per 100 parts by mass of the rubber component.

The wet performance of the tire can be greatly increased by using, in the rubber constituting the tread portion, a rubber composition including a rubber component containing a large amount of natural rubber that is highly compatible with a thermoplastic resin and including a particular type of thermoplastic resin that contributes to increasing the wet performance of the tire. Additionally, even if the flexibility of the tread increases, excellent steering stability can be achieved by setting the dynamic storage modulus (E') measured at 1% strain at 25° C. to a high value for the bead fillers disposed on the radial outside of the bead cores.

Rubber Component (A)

The content of the natural rubber (NR) in the rubber component (A) used in the rubber composition is 50 mass % or more, preferably 70 mass % or more, and more preferably 80 mass % or more. Setting the NR content in the rubber component (A) to 50 mass % or more makes it easier to sufficiently obtain the effect of compounding the below-described thermoplastic resin (B).

Styrene-butadiene copolymer rubber (SBR) is preferably included in the rubber component (A) at a content of 5 mass % to 50 mass %, more preferably 5 mass % to 30 mass %, and particularly preferably 10 mass % to 20 mass %. Compounding SBR in the rubber component increases the glass transition temperature (Tg) of the rubber composition, thereby improving the braking performance and steering stability on dry road surfaces. Such effects might be insufficient if the SBR content in the rubber component (A) falls below 5 mass %. If the SBR content in the rubber component (A) exceeds 50 mass %, the NR content in the rubber component (A) necessarily falls below 50 mass %, which not only reduces the aforementioned effect obtained by compounding NR but also leads to other problems such as a tendency for increased rolling resistance, because of greater heat generation in the rubber, and difficulty conforming to the road on slippery, wet road surfaces, because of reduced flexibility of the rubber.

Furthermore, as other rubber material, the rubber component (A) can include butadiene rubber, acrylonitrile-butadiene copolymer rubber, chloroprene rubber, polyisoprene rubber, and the like as appropriate.

Thermoplastic Resin (B)

The rubber composition includes, per 100 parts by mass of the rubber component, 5 parts by mass to 50 parts by mass of at least one kind of thermoplastic resin (B) selected from the group consisting of $C_5$-based resins, $C_5$- to $C_9$-based resins, $C_9$-based resins, terpene-based resins, terpene-aromatic compound-based resins, rosin-based resins, dicyclopentadiene resins, and alkylphenol-based resins.

By including a specified amount of the thermoplastic resin (B), the glass transition temperature (Tg) of the rubber composition increases, and the loss tangent (tan δ) at 0° C. improves, thereby mainly improving the performance of a tire on wet road surfaces (wet performance). The rubber component (A) in the rubber composition of this disclosure contains 50 mass % or more of NR as described above. Since the aforementioned thermoplastic resin (B) is highly compatible with NR, the aforementioned effects are particularly easy to obtain.

In this disclosure, the "$C_5$-based resins" refer to $C_5$-based synthetic petroleum resins, such as a solid polymer obtained by polymerizing a $C_5$ fraction using a Friedel-Crafts catalyst such as $AlCl_3$ or $BF_3$. Specific examples include a copolymer including, as main components, isoprene, cyclopentadiene, 1,3-pentadiene, and/or 1-pentene; a copolymer of 2-pentene and dicyclopentadiene; and a polymer mainly composed of 1,3-pentadiene.

Using a $C_5$-based resin as the thermoplastic resin (B) also allows further improvement in the braking performance on icy and snowy road surfaces.

The "$C_5$- to $C_9$-based resins" disclosed herein refer to $C_5$- to $C_9$-based synthetic petroleum resins, such as a solid polymer obtained by polymerizing a $C_5$ to $C_{11}$ fraction using a Friedel-Crafts catalyst such as $AlCl_3$ or $BF_3$. Examples of the "$C_5$- to $C_9$-based resins" include a copolymer including, as main components, styrene, vinyltoluene, α-methylstyrene, indene, and the like. As the $C_5$- to $C_9$-based resins disclosed herein, a resin with little $C_9$ or higher component is preferable in terms of compatibility with the component (A). Here, including "little $C_9$ or higher component" means that the amount of $C_9$ or higher component in the total amount of the resin is less than 50 mass %, preferably 40 mass % or less.

Using a $C_5$- to $C_9$-based resin as the thermoplastic resin (B) can also further improve handling performance.

Here, $C_5$ to $C_{11}$ fractions used in the polymerization of the solid polymer as the "$C_5$- to $C_9$-based resins" include fractions other than the $C_5$ fraction and $C_9$ fraction.

In this disclosure, the "$C_9$-based resins" refer to $C_9$-based synthetic petroleum resins, such as a solid polymer obtained by polymerizing a $C_9$ fraction using a Friedel-Crafts catalyst such as $AlCl_3$ or $BF_3$. Examples of the "$C_9$-based resin" include a copolymer including indene, α-methylstyrene, vinyltoluene, and the like as main components.

Using a $C_9$-based resin as the thermoplastic resin (B) can also further improve handling performance.

The aforementioned terpene-based resin is a solid-state resin obtained by compounding turpentine, which is obtained simultaneously when obtaining rosin from pine trees, or a polymerizable component separated from the turpentine, and then polymerizing the turpentine or the polymerizable component using a Friedel-Crafts catalyst. Examples of the terpene-based resin include β-pinene resins and α-pinene resins. A typical example of the terpene-aromatic compound-based resin is a terpene-phenol resin. The terpene-phenol resin may be obtained by reacting terpenes and various phenols using a Friedel-Crafts catalyst or by further condensing the resultant with formalin. While terpenes used as raw material are not limited, a monoterpene hydrocarbon such as α-pinene or limonene is preferable, a terpene including α-pinene is more preferable, and α-pinene itself is particularly preferable. In this disclosure, terpene-phenol resins with a small ratio of the phenol component may suitably be used. Here, a "small ratio of the phenol component" refers to the amount of phenol component in the total amount of the resin being less than 50 mass %, preferably 40 mass % or less.

Using a terpene-aromatic compound-based resin as the thermoplastic resin (B), in particular using a terpene-phenol resin, can also further improve handling performance.

Examples of the aforementioned rosin-based resins include the following as a natural resin rosin: a gum rosin, a tall oil rosin, and a wood rosin, which are included in raw pine rosin or tall oil. Further examples include the following as a modified rosin, a rosin derivative, or a modified rosin derivative: a polymeric rosin and its partially hydrogenated rosin; a glycerin ester rosin and its partially hydrogenated rosin or completely hydrogenated rosin; a pentaerythritol ester rosin and its partially hydrogenated rosin or polymeric rosin; and the like.

Using a rosin-based resin as the thermoplastic resin (B) can also further improve handling performance.

The aforementioned dicyclopentadiene resin refers to, for example, resins obtained by polymerizing dicyclopentadiene using a Friedel-Crafts catalyst, such as $AlCl_3$ or $BF_3$, or the like. Specific examples of commercially-available dicyclopentadiene resins include Quinton 1920 (Nippon Zeon Co., Ltd.), Quinton 1105 (Nippon Zeon Co., Ltd.), and Marukarez M-890A (Maruzen Petrochemical Co., Ltd.).

Using a dicyclopentadiene resin as the thermoplastic resin (B) can also further improve braking performance on an icy and snowy road surface.

Examples of the aforementioned alkylphenol-based resin include an alkylphenol-acetylene resin such as a p-tert-butylphenol-acetylene resin, an alkylphenol-formaldehyde resin having a low degree of polymerization, and the like.

Using an alkylphenol-based resin as the thermoplastic resin (B) can also further improve handling performance.

The aforementioned thermoplastic resin (B) is compounded at 5 parts by mass to 50 parts by mass, preferably 10 parts by mass to 30 parts by mass, per 100 parts by mass of the rubber component (A). Setting the compounding amount of the thermoplastic resin (B) to 5 parts by mass to 50 parts by mass per 100 parts by mass of the rubber component (A) can guarantee the desired fracture resistance and wear resistance. If the compounding amount of the thermoplastic resin (B) falls below 5 parts by mass, it is difficult to achieve sufficient wet performance, whereas if the compounding amount exceeds 50 parts by mass, the desired wear resistance or fracture resistance may be difficult to achieve.

Filler (C)

The filler (C) containing silica is compounded into the rubber composition at 20 parts by mass to 120 parts by mass, preferably 50 parts by mass to 100 parts by mass, per 100 parts by mass of the rubber component (A).

The silica content in the filler (C) is preferably 50 mass % to 100 mass %, more preferably 80 mass % to 100 mass %, and particularly preferably 90 mass % to 100 mass %. In other words, 10 parts by mass to 120 parts by mass of silica per 100 parts by mass of the rubber component (A) are preferably included in the rubber composition of this disclosure, with 45 parts by mass to 100 parts by mass of silica being more preferable.

Setting the compounding amount of the filler (C) to 20 parts by mass to 120 parts by mass per 100 parts by mass of the rubber component (A) achieves a reinforcing effect, without impairing characteristics such as the flexibility of the rubber component (A). Furthermore, setting the compounding amount of silica in the filler (C) to be 50 mass % to 100 mass % in particular offers the advantage of effects such as reducing the rolling resistance and improving the wet performance, while also tending not to impair the flexibility of the rubber component.

Compounding silica in the rubber composition achieves the effect of providing the rubber composition with a sufficient reinforcing property and a low heat generating property, without impairing the flexibility thereof, in a state where the NR and the thermoplastic resin (B) are favorably dispersed. Accordingly, the rubber composition of this disclosure is flexible enough to have a good property of conforming to a road surface with a low friction coefficient (for example, a slippery, wet road surface such as a manhole), thereby achieving sufficient braking performance on such a slippery, wet road surface.

Examples of the aforementioned silica include wet silica (hydrous silicate), dry silica (anhydrous silicate), calcium silicate, and aluminum silicate, with use of wet silica being particularly suitable. The BET specific surface area of the wet silica is preferably 40 $m^2/g$ to 350 $m^2/g$, more preferably 150 $m^2/g$ to 300 $m^2/g$, and even more preferably 200 $m^2/g$ to 250 $m^2/g$. Silica having a BET specific surface area within the aforementioned ranges offers the advantage of making the rubber reinforcing property compatible with dispersiveness into the rubber component. For this reason, the silica more preferably has a BET specific surface area within a range of 80 $m^2/g$ to 300 $m^2/g$. The commercially-available products "Nipsil AQ" and "Nipsil KQ" produced by Tosoh Silica Corporation and the product "ULTRASIL VN3" produced by Evonik Industries AG may be used as such silica. The silica may be used alone or in combination of two or more kinds thereof.

In addition to the above-described silica, the filler (C) can include carbon black, aluminum hydroxide, clay, alumina, talc, mica, kaolin, glass balloon, glass beads, calcium carbonate, magnesium carbonate, magnesium hydroxide, magnesium oxide, titanium oxide, potassium titanate, barium sulfate, and the like as appropriate.

Silane Coupling Agent

The rubber composition can further include a silane coupling agent for further improvement of the reinforcing property of the compounded silica and for a lower heat generating property.

Specific examples of the silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl) tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropylmethacrylate monosulfide, 3-trimethoxysilylpropylmethacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, and dimethoxymethylsilylpropylhenzothiazolyl tetrasulfide. Among these, bis(3-triethoxysilylpropyl)polysulfide and 3-trimethoxysilylpropylbenzothiazyl tetrasulfide are suitable for achieving the effect of improving the reinforcing property.

Of the aforementioned silane coupling agents, one kind may be used alone, or two or more kinds may be used in combination.

In the rubber composition of this disclosure, the compounding amount of the silane coupling agent varies by factors such as the type of silane coupling agent but is preferably selected to fall within a range of 2 mass % to 25 mass % relative to the amount of silica. If the amount is less than 2 mass %, the silane coupling agent is less likely to fully achieve the effect thereof, whereas an amount exceeding 25 mass % may cause gelation of the rubber component. To achieve the effect as a coupling agent and to prevent gelation, the compounding amount of the silane coupling agent is more preferably within the range of 2 mass % to 20 mass %, even more preferably within the range of 5 mass % to 18 mass %, and particularly preferably within the range of 5 mass % to 15 mass %.

Softener (D)

The rubber composition may further contain a softener (D). Here, examples of the softener (D) include a petroleum softener such as an aroma oil, a paraffin oil, or a naphthene oil; and a plant-based softener such as a palm oil, a castor oil, a cottonseed oil, or a soybean oil. When compounding the softener (D), the softener (D) is preferably in a liquid state at a room temperature of approximately 25° C. in view of ease of handling. Among the above-listed softeners, for example, a petroleum softener such as an aroma oil, a paraffin oil, or a naphthene oil is preferably compounded, and preferably no plant-based softener is compounded. When compounding the softener (D), the rubber composition is preferably prepared by compounding 10 parts by mass or less of the softener (D), more preferably 5 parts by mass or less, per 100 parts by mass of the rubber component (A). Setting the compounding amount of the softener (D) to 10 parts by mass or less per 100 parts by mass of the rubber component (A) can enhance the effect of improving braking performance on a wet road surface, such as a manhole, that is slipperier than an asphalt road surface. To improve the wet performance, however, it is particularly preferable not to compound the softener (D) in the rubber composition of this disclosure.

Other Components

In addition to the rubber component (A), the thermoplastic resin (B), the filler (C), and the softener (D), the rubber composition of this disclosure can be compounded with other compounding agents typically used in the rubber industry. For example, an antioxidant, a vulcanization accelerator, a vulcanization accelerator aid, a vulcanizing agent, and the like may be appropriately selected in a range that does not impede the object of this disclosure and compounded in an amount within a typical range. Commercially-available agents may suitably be used as the compounding agents. The rubber composition of this disclosure can be manufactured by compounding the rubber component (A) including NR with the thermoplastic resin (B), the filler (C), the softener (D) appropriately selected as necessary, and/or various compounding agents, and by subjecting the resulting compound to processes such as kneading, warming, and extrusion.

A known method can be used as the method for using the rubber composition in the tread rubber.

For example, the above-described rubber composition can be used as the tread rubber to form a raw tire, and the raw tire can be vulcanized with a typical method to manufacture a tire.

The 50% modulus of the tread rubber is preferably 1.0 MPa or lower.

The reason is that setting the 50% modulus of the tread rubber within the aforementioned range can achieve a better reduction in the rolling resistance as a result of the below-described synergistic effect with the bead filler (the rolling resistance is low both at low temperatures and at high temperatures, and the difference in rolling resistance between low temperatures and high temperatures is small).

Bead Filler

The dynamic storage modulus (E'), measured at 1% strain, of the bead filler in the tire of this disclosure exceeds 50 MPa.

Conventionally, when the flexibility of the tread is increased to improve the wet performance, a resulting deterioration in steering stability has been feared. With this disclosure, however, the dynamic storage modulus (E') of the bead filler is set high, thereby increasing the rigidity of the tire. As a result, excellent steering stability can also be achieved.

From the same perspective, the dynamic storage modulus (E') of the bead filler measured at 1% strain is preferably 70 MPa or higher and more preferably 100 MPa or higher. Furthermore, if the dynamic storage modulus (E') of the bead filler measured at 1% strain is too large, the ride comfort and ease of rim assembly may degrade. Therefore, the upper limit is preferably approximately 150 MPa.

In this disclosure, the dynamic storage modulus (E') is measured at a measurement temperature of 25° C. and 1% strain.

As long as the dynamic storage modulus (E') measured at 1% strain can exceed 50 MPa, the formulation of the rubber composition that constitutes the bead filler is not limited, and a known formulation may be used.

For example, the bead filler can be manufactured using a rubber composition made of natural rubber, carbon black, silica, sulfur, a vulcanization accelerator, and the like.

The carbon black and the silica are compounded as fillers. The total compounding amount of the fillers is preferably 20 parts by mass to 130 parts by mass per 100 parts by mass of the rubber component. To achieve the dynamic storage modulus (E') of the bead filler of this disclosure, the compounding amount of the carbon black is preferably 50 parts by mass or greater, and more preferably 65 parts by mass or greater, per 100 parts by mass of the rubber component.

Furthermore, to achieve the dynamic storage modulus (E') of the bead filler of this disclosure, a thermosetting resin is preferably compounded. Examples of the thermosetting resin include a novolac-type phenol resin, a modified polyolefin resin, and a resorcin resin. The compounding amount of the thermosetting resin is preferably 10 parts by mass or greater, and more preferably 15 parts by mass or greater, per 100 parts by mass of the rubber component.

The ratio of the 50% modulus of the tread rubber to the dynamic storage modulus (E') of the bead filler measured at 1% strain (50% modulus of rubber/E') is preferably 0.005 to 0.02 and more preferably 0.005 to 0.01.

The reason is that setting the 50% modulus of the bead filler with respect to the 50% modulus of the tread rubber within the above ranges achieves even better wet performance and steering stability.

EXAMPLES

This disclosure is described in more detail below with reference to Examples, by which this disclosure is not intended to be limited in any way.

Samples 1 to 22

Rubber compositions were prepared according to the formulations shown in Table 1. The rubber compositions thus prepared were each used as tread rubber to produce, with a typical method, a radial tire of size 195/65R15 for a passenger vehicle (Samples 1 to 17).

The bead filler was manufactured with a rubber composition having a formulation constituted by natural rubber, carbon black, sulfur, and a vulcanization accelerator. The 50% modulus of the tread rubber in the produced radial tire for passenger vehicles was measured by cutting out a sheet with a rubber thickness of 0.3 mm, preparing a test sample by cutting with a DINS3A-type blade, and pulling the sample under the condition of a pulling speed of 100 mm/min. Table 1 lists the measurement results.

The dynamic storage modulus (E') of the bead filler measured at 1% strain in the produced radial tire for passenger vehicles was measured by cutting out the bead filler from the tire, preparing a 2 mm thick by 5 mm wide by 40 mm long sheet, and measuring the sheet at a measuring temperature of 25° C., an initial load of 160 mg, and a dynamic strain of 1% using a spectrometer manufactured by Ueshima Seisakusho Co., Ltd. Table 1 lists the measurement results.

Evaluation

The following evaluations were then performed on the produced sample tires.

(1) Wet Performance

Four tires of each sample were mounted onto a 2000 cc displacement passenger vehicle. The passenger vehicle was run on a steel-plate wet road evaluation path as a test course. The brakes were then applied at a speed of 40 km/h to lock the tires, and the distance it took to stop was measured.

The results are listed as an index, with the value for a control tire being 100. A larger index value indicates better performance on a steel-plate wet road surface. The control tire serving as a standard for evaluation was sample 1 in the evaluation of samples 1 and 2, sample 3 in the evaluation of samples 3 and 4, and sample 5 in the evaluation of samples 5 to 22.

(2) Steering Stability

Four tires of each sample were mounted onto a 2000 cc displacement passenger vehicle. In an actual vehicle test on a dry road surface, the steering stability was qualitatively evaluated by a test driver. The evaluation criteria were used to evaluate superiority to a control tire, with specific evaluation criteria being as follows.
A: Steering stability is far better than when using the control tire
B: Steering stability is better than when using the control tire
C: Steering stability is somewhat better than when using the control tire
D: Steering stability is equivalent to use of the control tire The control tire serving as a standard for evaluation was sample 1 in the evaluation of samples 1 and 2, sample 3 in the evaluation of samples 3 and 4, and sample 5 in the evaluation of samples 5 to 22.

TABLE 1

| | | Sample No. | 1 Comparative Example | 2 Comparative Example | 3 Comparative Example | 4 Comparative Example | 5 Comparative Example | 6 Example | 7 Example |
|---|---|---|---|---|---|---|---|---|---|
| Rubber composition formulation (parts by mass) | (A) | NR *1 | 40 | 40 | 40 | 40 | 60 | 60 | 60 |
| | | BR *2 | — | — | — | — | 40 | 40 | 40 |
| | | SBR *3 | 60 | 60 | 60 | 60 | — | — | — |
| | (B) | $C_5$-based resin *4 | — | — | — | — | — | — | — |
| | | $C_5$- to $C_9$-based resin *5 | — | — | — | — | — | — | — |
| | | $C_9$-based resin *6 | — | — | 15 | 15 | 15 | 15 | 15 |
| | | Terpene-phenol resin *7 | — | — | — | — | — | — | — |
| | | Alkylphenol-based resin *9 | — | — | — | — | — | — | — |
| | (C) | CB *11 | 5 | 5 | 5 | 5 | 5 | 5 | 5 |
| | | Silica *12 | 55 | 55 | 55 | 55 | 55 | 55 | 55 |
| | (D) | Aroma oil | 15 | 15 | — | — | — | — | — |
| | | Stearic acid | 2 | 2 | 2 | 2 | 2 | 2 | 2 |
| | | Antioxidant *16 | 1 | 1 | 1 | 1 | 1 | 1 | 1 |
| | | Zinc oxide | 2 | 2 | 2 | 2 | 2 | 2 | 2 |
| | | Vulcanization accelerator *17 | 0.8 | 0.8 | 0.8 | 0.8 | 0.8 | 0.8 | 0.8 |
| | | Sulfur | 1 | 1 | 1 | 1 | 1 | 1 | 1 |
| Silica content in filler (C) (mass %) | | | 92 | 92 | 92 | 92 | 92 | 92 | 92 |
| Content of filler (C) (parts by mass) | | | 60 | 60 | 60 | 60 | 60 | 60 | 60 |
| 50% modulus of tread rubber | | | 1.1 | 1.1 | 1 | 1 | 0.9 | 0.9 | 0.9 |
| Dynamic storage modulus E' (MPa) of bead filler at 1% strain and 25° C. | | | 40 | 110 | 40 | 110 | 40 | 110 | 70 |
| Evaluation | | Wet performance | 100 | 103 | 100 | 104 | 100 | 107 | 103 |
| | | Steering stability | D | C | D | C | D | C | C |

TABLE 1-continued

| Sample No. | | | 8 Example | 9 Example | 10 Example | 11 Example | 12 Example | 13 Example | 14 Example | 15 Example |
|---|---|---|---|---|---|---|---|---|---|---|
| Rubber composition formulation (parts by mass) | (A) | NR *1 | 70 | 100 | 100 | 100 | 100 | 100 | 100 | 100 |
| | | BR *2 | 30 | — | — | — | — | — | — | — |
| | | SBR *3 | — | — | — | — | — | — | — | — |
| | (B) | C$_5$-based resin *4 | — | — | — | — | — | 15 | — | — |
| | | C$_5$- to C$_9$-based resin *5 | — | — | — | — | — | — | 15 | — |
| | | C$_9$-based resin *6 | 15 | 15 | 15 | 5 | 30 | — | — | — |
| | | Terpene-phenol resin *7 | — | — | — | — | — | — | — | 15 |
| | | Alkylphenol-based resin *9 | — | — | — | — | — | — | — | — |
| | (C) | CB *11 | 5 | 5 | 5 | 5 | 5 | 5 | 5 | 5 |
| | | Silica *12 | 55 | 55 | 55 | 55 | 55 | 55 | 55 | 55 |
| | (D) | Aroma oil | — | — | — | — | — | — | — | — |
| | | Stearic acid | 2 | 2 | 2 | 2 | 2 | 2 | 2 | 2 |
| | | Antioxidant *16 | 1 | 1 | 1 | 1 | 1 | 1 | 1 | 1 |
| | | Zinc oxide | 2 | 2 | 2 | 2 | 2 | 2 | 2 | 2 |
| | | Vulcanization accelerator *17 | 0.8 | 0.8 | 0.8 | 0.8 | 0.8 | 0.8 | 0.8 | 0.8 |
| | | Sulfur | 1 | 1 | 1 | 1 | 1 | 1 | 1 | 1 |
| Silica content in filler (C) (mass %) | | | 92 | 92 | 92 | 92 | 92 | 92 | 92 | 92 |
| Content of filler (C) (parts by mass) | | | 60 | 60 | 60 | 60 | 60 | 60 | 60 | 60 |
| 50% modulus of tread rubber | | | 0.9 | 0.8 | 0.8 | 0.9 | 0.7 | 0.8 | 0.8 | 0.8 |
| Dynamic storage modulus E' (MPa) of bead filler at 1% strain and 25° C. | | | 110 | 110 | 70 | 110 | 110 | 110 | 110 | 110 |
| Evaluation | | Wet performance | 109 | 112 | 108 | 107 | 117 | 117 | 116 | 118 |
| | | Steering stability | B | B | B | A | C | C | C | B |

| Sample No. | | | 16 Example | 17 Example | 18 Example | 19 Example | 20 Example | 21 Example | 22 Example |
|---|---|---|---|---|---|---|---|---|---|
| Rubber composition formulation (parts by mass) | (A) | NR *1 | 100 | 85 | 85 | 85 | 50 | 50 | 50 |
| | | BR *2 | — | — | — | — | — | — | — |
| | | SBR *3 | — | 15 | 15 | 15 | 50 | 50 | 50 |
| | (B) | C$_5$-based resin *4 | — | — | 15 | — | — | 15 | — |
| | | C$_5$- to C$_9$-based resin *5 | — | — | — | — | — | — | — |
| | | C$_9$-based resin *6 | — | 15 | — | — | 15 | — | — |
| | | Terpene-phenol resin *7 | — | — | — | — | — | — | — |
| | | Alkylphenol-based resin *9 | 15 | — | — | 15 | — | — | 15 |
| | (C) | CB *11 | 5 | 5 | 5 | 5 | 5 | 5 | 5 |
| | | Silica *12 | 55 | 55 | 55 | 55 | 55 | 55 | 55 |
| | (D) | Aroma oil | — | — | — | — | — | — | — |
| | | Stearic acid | 2 | 2 | 2 | 2 | 2 | 2 | 2 |
| | | Antioxidant *16 | 1 | 1 | 1 | 1 | 1 | 1 | 1 |
| | | Zinc oxide | 2 | 2 | 2 | 2 | 2 | 2 | 2 |
| | | Vulcanization accelerator *17 | 0.8 | 0.8 | 0.8 | 0.8 | 0.8 | 0.8 | 0.8 |
| | | Sulfur | 1 | 1 | 1 | 1 | 1 | 1 | 1 |
| Silica content in filler (C) (mass %) | | | 92 | 92 | 92 | 92 | 92 | 92 | 92 |
| Content of filler (C) (parts by mass) | | | 60 | 60 | 60 | 60 | 60 | 60 | 60 |
| 50% modulus of tread rubber | | | 0.8 | 1 | 1 | 1 | 1 | 1 | 1 |
| Dynamic storage modulus E' (MPa) of bead filler at 1% strain and 25° C. | | | 110 | 110 | 110 | 110 | 110 | 110 | 110 |
| Evaluation | | Wet performance | 118 | 116 | 120 | 117 | 120 | 117 | 122 |
| | | Steering stability | B | A | B | A | A | A | A |

*1: natural rubber: RSS#3
*2: butadiene rubber: BR01
*3: styrene-butadiene copolymer rubber: #1500
*4: C$_5$-based resin: ExxonMobil Chemical Company, product name: ECR1102
*5: C$_5$- to C$_9$-based resin: ExxonMobil Chemical Company, product name: ECR213
*6: C$_9$-based resin: Nippon Petrochemicals Co., Ltd., product name: Neopolymer 140
*7: terpene-phenol resin: Yasuhara Chemical Co., Ltd., product name: YS Polystar T100
*9: alkylphenol-based resin: SI GROUP, product name: R7510PJ
*11: carbon black: Tokai Carbon Co., Ltd., product name: SEAST 7HM, N234
*12: silica: Tosoh Silica Corporation, product name: Nipsil AQ, BET specific surface area of 205 m$^2$/g
*16: antioxidant: 6PPD
*17: vulcanization accelerator: DPG The results in Table 1 show excellent wet performance and steering stability for each of the samples according to the Examples as compared to the samples according to the Comparative Examples.

A comparison of sample 5 (Comparative Example) with sample 6 (Example) also show that optimizing the dynamic storage modulus of the bead filler not only improves the steering stability but also greatly improves the wet performance, even when using the same tread rubber. Hence, a synergistic effect between optimization of the tread rubber and optimization of the bead filler was observed.

INDUSTRIAL APPLICABILITY

According to this disclosure, a tire that has excellent wet performance without leading to a reduction in steering stability can be provided.

REFERENCE SIGNS LIST

1 Bead portion
2 Sidewall portion
3 Tread portion
4 Carcass
5 Belt layer
6 Bead core
7 Bead filler

The invention claimed is:

1. A tire comprising:
a tread portion; and
a pair of bead portions comprising a bead core and a bead filler disposed on a radial outside of the bead core, wherein
tread rubber forming the tread portion comprises a rubber composition including a rubber component (A) including 50 mass % or more of natural rubber, at least one kind of thermoplastic resin (B) selected from the group consisting of $C_5$-based resins, $C_5$- to $C_9$-based resins, $C_9$-based resins, terpene-based resins, terpene-aromatic compound-based resins, rosin-based resins, dicyclopentadiene resins, and alkylphenol-based resins, 5 parts by mass to 50 parts by mass per 100 parts by mass of the rubber component (A) of the at least one kind of thermoplastic resin (B) being included, and a filler (C) including silica whose content in the filler (C) is 90 mass % or higher, 20 parts by mass to 120 parts by mass per 100 parts by mass of the rubber component (A) of the filler (C) being included, and
a dynamic storage modulus (E') of the bead filler measured at 1% strain at 25° C. exceeds 50 MPa, and the bead filler is manufactured using a rubber composition comprising a rubber component, fillers of 20 parts by mass to 130 parts by mass per 100 parts by mass of the rubber component and a thermosetting resin of 10 parts by mass or more per 100 parts by mass of the rubber component.

2. The tire of claim 1, wherein 10 mass % to 50 mass % of styrene-butadiene copolymer rubber is included in the rubber component (A).

3. The tire of claim 2, wherein a 50% modulus of the tread rubber is 1.0 MPa or lower.

4. The tire of claim 3, wherein a ratio of the 50% modulus of the tread rubber to the dynamic storage modulus (E') of the bead filler is 0.005 to 0.02.

5. The tire of claim 1, wherein a 50% modulus of the tread rubber is 1.0 MPa or lower.

6. The tire of claim 5, wherein a ratio of the 50% modulus of the tread rubber to the dynamic storage modulus (E') of the bead filler is 0.005 to 0.02.

* * * * *